United States Patent [19]

Linscott, Jr.

[11] 4,060,745

[45] Nov. 29, 1977

[54] STRUCTURE FOR ATTACHING A PERMANENT MAGNET TO A ROTATING SHAFT

[75] Inventor: Phillip S. Linscott, Jr., Rockford, Ill.

[73] Assignee: Sundstrand Corporation, Rockford, Ill.

[21] Appl. No.: 670,139

[22] Filed: Mar. 25, 1976

[51] Int. Cl.² .......................................... H02K 21/08
[52] U.S. Cl. .................................... 310/156; 310/43; 310/261
[58] Field of Search .................. 310/42, 43, 152, 156, 310/261

[56] References Cited

U.S. PATENT DOCUMENTS

| 2,190,956 | 2/1940 | Tognola | 310/156 |
|---|---|---|---|
| 2,269,651 | 1/1942 | Crocker | 310/156 |
| 2,719,931 | 10/1955 | Kober | 310/156 |
| 3,121,814 | 2/1964 | Kober | 310/156 |
| 3,320,453 | 5/1967 | Kober | 310/156 X |
| 3,979,821 | 9/1976 | Noodleman | 310/156 X |

*Primary Examiner*—Donovan F. Duggan
*Attorney, Agent, or Firm*—Michael McMurry; Ted Killingsworth; William Peoples

[57] ABSTRACT

In order to minimize stresses on a circular rotatable permanent magnet attached to a shaft in a dynamoelectric machine, the shaft of the machine is provided with a circular support portion having an outer supporting surface and a shoulder at one end wherein a shouldered ring secured to the support portion cooperates with the shoulder on the support member to axially retain the magnet on the shaft. Rotational slippage of the magnet on the shaft is prevented by a pin which is engaged with both the magnet and the shouldered ring or, alternatively, by a key inserted between the support portion and the magnet. A flexible material is interposed between the supporting surface and the magnet in order to reduce vibration and motion of the magnet on the shaft.

9 Claims, 2 Drawing Figures

U.S. Patent  Nov. 29, 1977  4,060,745
STRUCTURE FOR ATTACHING A PERMANENT MAGNET TO A ROTATING SHAFT

BACKGROUND OF THE INVENTION

The invention relates generally to the field of dynamoelectric machines, and more particularly, a method for securing a permanent magnet to a rotating shaft.

In many dynamoelectric machines, such as self-excited synchronous generators used in aircraft, a permanent magnet generator is utilized as a source of excitation current and includes a circular permanent magnet secured to the machine's shaft. However, a number of problems have been encountered in securing a permanent magnet to a rotating shaft, due primarily to the nature of the materials used for the permanent magnet. For example, the materials used for the permanent magnets, such as Alnico VI, tend to be brittle and in many cases have various metallurgical defects including excessive porosity. One approach to this problem has been to attach the magnet to the shaft by means of circumferential clamping. However, clamping the magnet to the shaft by this method tends to place excessive stress on the magnet, resulting in fractures during the operation of the machine. Another approach has been to use an adhesive material to secure the magnet to the shaft. One disadvantage of this approach results from the temperature-sensitive nature of the adhesive, wherein the adhesive properties tend to fail at elevated temperatures, thus allowing the magnet to become disengaged from the shaft. In many applications this is a serious consideration, since generators, and aircraft generators in particular, quite often are required to function in high temperature environments. Perhaps one of the greatest problems with the adhesive method of attachment results from the differing thermal expansion rate of the steel shaft material and the permanent magnet material. For example, if the magnetic material has a coefficient of expansion greater than the material of the shaft, at high temperatures the magnetic material would tend to expand away from the shaft, thereby placing excessive strains on the adhesive material. On the other hand, if the magnetic material has a coefficient of expansion less than the shaft material, the shaft would expand at a greater rate than the magnetic material at higher temperatures, thus placing unacceptable tensile stress on the magnet, thereby significantly increasing the probability of fracturing the magnetic material.

SUMMARY OF THE INVENTION

It is therefore an object of the invention to provide a structure for retaining a circular permanent magnet on a rotating shaft wherein the shaft is configured with a support portion having a shoulder; a shouldered ring secured to the support portion of the shaft effective to axially retain the permanent magnet on the support portion; and a securing member such as a pin or a key engaged with the magnet and the shaft to prevent the magnet from rotating with respect to the shaft.

It is an additional object of the invention to provide a structure for retaining a circular permanent magnet on a rotating shaft having a support portion configured out of the shaft cooperating with a shouldered ring to axially retain the magnet on the shaft along with a member engaged with both the magnet and the shaft to prevent the magnet from rotating on the shaft wherein a flexible material is interposed between the support portion and the magnet.

DETAILED DESCRIPTION OF THE INVENTION

Figure 1:
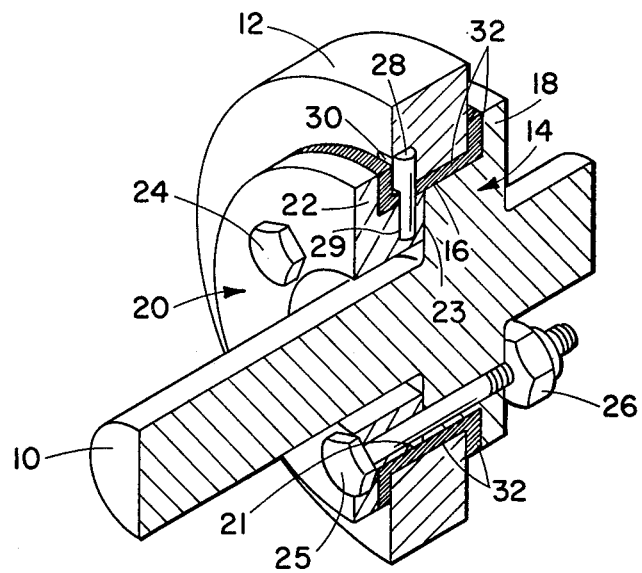
FIG. 1 is a perspective view of a first structure for retaining a permanent magnet on a shaft.

In FIG. 1 of the drawings is illustrated a first embodiment of the invention. Rotatable inside a dynamoelectric machine is a shaft 10 which supports an annular circular permanent magnet 12. The permanent magnet 12 is typically used as a portion of a permanent magnet generator in a self-excited dynamoelectric machine such as a synchronous generator. The shaft 10 includes a circular integral support portion 14 which in turn includes an outer circular support surface 16 on its outer diameter and an annular shoulder portion 18 to prevent the magnet 12 from moving axially to the right. Secured to the support member 14 is a shouldered ring 20 which includes an outer support surface 21 and an annular shoulder portion 22 that prevents the magnet from sliding axially to the left along the surface 21. Thus, the shoulders 18 and 22 cooperate to axially retain the magnet 12 on the support surface 16. The shoulders 18 and 22 are spaced by contact of the end of the ring 20 with the end surface 23 of the support 14. In this particular embodiment of the invention, the shoulder ring 20 is secured to the support portion 14 of the shaft 10 by means of a plurality of fastening devices, as represented by bolts 24, 25 and lock-nut 26. As illustrated, the surface 16 and the surface 21 afford support for the magnet 12, but it should be understood that the support may be afforded primarily by surface 16 rather than ring 20.

In the first embodiment of the invention as illustrated in FIG. 1, the magnet 12 is prevented from rotating with respect to the shaft 10 by means of a pin 28. The pin 28 is inserted into a hole or receptacle 29 in the shouldered ring 20, preferably by means of a press fit. The inner surface of the magnet 12 is configured with a slot 30 which is slightly larger in width than the diameter of the pin 28 and serves to engage the magnet 12 with the pin 28.

In order to prevent compressive stresses on the magnet 12, which could lead to failures due to fracturing, the distance between the shoulders 18 and 22 is greater than the axial width of the magnet 12 for all anticipated operating temperatures. This is to insure that there are no axial compressive forces acting on the magnet 12 due to thermal expansion of the shoulders 18 and 22 which might tend to cause fracturing of the magnetic material. By the same token, the support portion and retaining ring 20 are configured so that the diameter of the supporting surfaces 16 and 21 will always be at least slightly less than the inside diameter of the magnet 12 for any anticipated operating temperatures. This is to prevent thermally induced expansion of the shaft from applying a tensile stress to the magnet 12.

In order to prevent vibration and excessive movement of the magnet 12 on the shaft 10, a flexible material 32 is interposed between the inside diameter of the magnet 12 and the supporting surfaces 16 and 21 and between the ends of the magnet and the shoulders 18 and 22. The flexible material 32 occupies the radial and axial clearance between the supporting surfaces and the permanent magnet 12. The distances between the supporting surfaces and the magnet 12 are exaggerated slightly in FIGS. 1 and 2 for clarity of illustration. A wide variety of materials are suitable for the flexible material 32, including various rubber compounds or even an O-ring, but the preferred material is the trademarked LOCTITE material or other materials that conform to the Military Specifications Mil-R-46082-A or Mil-S-22473-D. Preferably, the flexible material 32 will have a temperature expansion characteristic such that the flexible material 32 will in effect absorb temperature expansion of the shaft 10 or the magnet without applying excessive stress to the magnet 12 and at the same time remain in contact with the shaft and the magnet during any anticipated temperature or rotational operating conditions.

Figure 2:
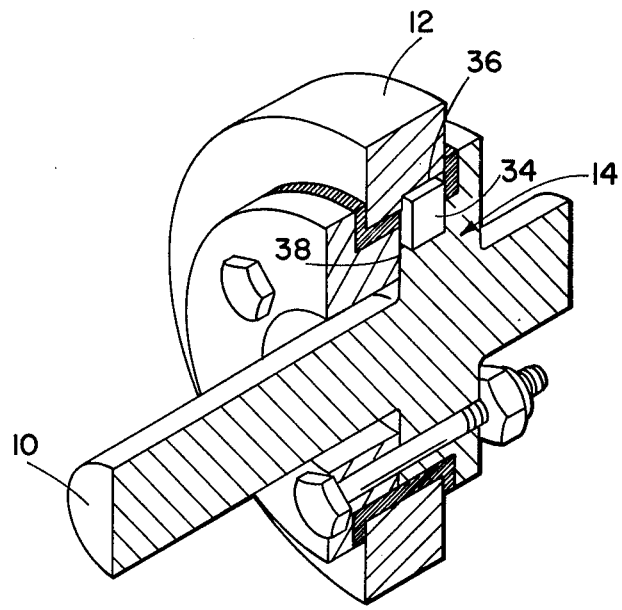
FIG. 2 is a perspective view of a second structure for retaining a permanent magnet on a shaft.

A second embodiment of the invention is illustrated in FIG. 2. This embodiment differs from the one shown in FIG. 1 principally in the manner in which the magnet 12 is prevented from rotating with respect to the shaft 10. Instead of the pin 28 secured to the shoulder ring 20 as in FIG. 1, the magnet 12 is prevented from rotating with respect to the shaft 10 by means of a key 34 which is inserted in a keyway slot 36 configured out of the permanent magnet 12 and a keyway slot 38 configured out of the support portion 14.

I claim:
1. A rotatable structure comprising:
   a shaft;
   an annular magnet;
   a generally circular support portion integral with the shaft having an outer supporting surface with a diameter less than the inside diameter of the permanent magnet and additionally including a shoulder portion effective to restrain axial movement of the permanent magnet in a first axial direction;
   a shouldered ring having a shoulder effective to restrain axial movement of the permanent magnet in a second axial direction;
   means for securing said shouldered ring to said support portion;
   at least one securing member engaged with the permanent magnet to prevent the rotation of the magnet with respect to the shaft; and
   a flexible material interposed between the said supporting surface and the magnet.
2. The structure of claim 1 wherein said securing member is a pin and said shouldered ring is configured with at least one receptacle for receiving one end of said pin.
3. The structure of claim 2 wherein said pin is secured in said receptacle by means of a press fit.
4. The structure of claim 2 wherein the magnet is configured with a slot effective to receive the other end of said pin.
5. The structure of claim 1 wherein said support portion and the interior surface of the magnet are configured with keyway slots and said securing member is a key wherein said key engages each of said slots.
6. The structure of claim 1 wherein said diameter of said supporting surface is less than the inside diameter of the magnet for all anticipated operating temperatures.
7. The structure of claim 6 wherein the distance between the shoulder portion of said support portion and the shoulder of said shouldered ring is greater than the axial width of the magnet contained between the shoulders for all anticipated operating temperatures.
8. The structure of claim 1 wherein said means for securing said shouldered ring to said support member includes a plurality of bolt and nut assemblies spaced about the radius of said shouldered ring and said support member.
9. A rotatable magnet structure, comprising:
   a rotary shaft having an enlarged central magnet support portion including a peripheral magnet support surface and a shoulder at one end of the support surface for limiting axial movement of a magnet on the support surface;
   an annular magnet disposed on the shaft support portion;
   a retaining ring on the shaft having one end engaging the end of the enlarged shaft support portion remote from said shoulder;
   a peripheral magnet support surface on the retaining ring and an annular shoulder on the retaining ring opposed to the shoulder on the shaft for limiting axial movement of the magnet on the shaft;
   means securing the retaining ring on the shaft with the magnet held between the shoulder; and
   a flexible material interposed between said magnet support surfaces and said magnet.

* * * * *